United States Patent
Fellhauer

(10) Patent No.: US 6,808,300 B2
(45) Date of Patent: Oct. 26, 2004

(54) BRAKE LIGHT

(76) Inventor: Frank Fellhauer, 2-3131 Kaumualii Hwy., Lawaui, HI (US) 96765

(*) Notice: Subject to any disclaimer, the term of this patent is extended or adjusted under 35 U.S.C. 154(b) by 0 days.

(21) Appl. No.: 09/975,664

(22) Filed: Oct. 10, 2001

(65) Prior Publication Data

US 2002/0041495 A1 Apr. 11, 2002

Related U.S. Application Data

(60) Provisional application No. 60/238,688, filed on Oct. 10, 2000.

(51) Int. Cl.[7] .................................................. B60Q 1/44
(52) U.S. Cl. ........................ 362/541; 362/240; 362/545
(58) Field of Search ................................ 362/487, 543, 362/546, 240, 540, 541, 252, 544, 545, 340

(56) References Cited

U.S. PATENT DOCUMENTS

| 1,894,173 A | * | 1/1933 | Haines ........................ 362/543 |
| 4,954,808 A | * | 9/1990 | Duerkob ...................... 340/475 |
| 5,059,015 A | * | 10/1991 | Tran ............................ 359/844 |
| 5,255,165 A | * | 10/1993 | Cail ........................... 362/80.1 |
| 5,373,426 A | | 12/1994 | O'Sullivan |
| 5,680,101 A | | 10/1997 | Pitcher |
| 5,758,944 A | | 6/1998 | Jandron |
| 5,826,965 A | * | 10/1998 | Lyons ......................... 362/477 |
| 6,511,216 B2 | * | 1/2003 | Strickland .................... 362/542 |

* cited by examiner

*Primary Examiner*—Alan Cariaso
*Assistant Examiner*—Anabel Ton
(74) *Attorney, Agent, or Firm*—Matthew J. Peirce

(57) ABSTRACT

A new and improved brake light is disclosed. The brake light would be a forward-facing brake light which would attach to the center front top deck, or hood, of automobiles. The brake light would be hooked up to the brake system of a vehicle to which the present invention would be attached.

7 Claims, 2 Drawing Sheets

BRAKE LIGHT

REFERENCE TO RELATED APPLICATIONS

This application claims benefit of Provisional Application 60/238,688 filed Oct. 10, 2000.

I. BACKGROUND OF THE INVENTION

The present invention concerns that of a new and improved brake light.

II. DESCRIPTION OF THE PRIOR ART

U.S. Pat. No. 5,758,944, issued to Jandron, discloses vehicle side/front brake lights comprising a brake indicator bulb located in a recess formed in a side of a vehicle at a front extent thereof.

U.S. Pat. No. 5,680,101, issued to Pitcher, discloses a light of standard color which is illuminated when the braking means of a vehicle is applied.

U.S. Pat. No. 5,373,426, issued to O'Sullivan, discloses a vehicle brake light signal for alerting pedestrians or other vehicle drivers positioned in front of a vehicle to a deceleration of the associated vehicle.

III. SUMMARY OF THE INVENTION

The present invention concerns that of a new and improved brake light. The brake light would be a forward-facing brake light which would attach to the center front top deck, or hood, of automobiles. The brake light would be hooked up to the brake system of a vehicle to which the present invention would be attached.

There has thus been outlined, rather broadly, the more important features of a brake light in order that the detailed description thereof that follows may be better understood and in order that the present contribution to the art may be better appreciated. There are, of course, additional features of the brake light that will be described hereinafter and which will form the subject matter of the claims appended hereto.

In this respect, before explaining at least one embodiment of the brake light in detail, it is to be understood that the brake light is not limited in its application to the details of construction and to the arrangements of the components set forth in the following description or illustrated in the drawings. The brake light is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present brake light. It is important, therefore, that the claims be regard as including such equivalent constructions insofar as they do not depart from the spirit and scope of the present invention.

It is therefore an object of the present invention to provide a brake light which has all of the advantages of the prior art and none of the disadvantages.

It is another object of the present invention to provide a brake light which may be easily and efficiently manufactured and marketed.

It is another object of the present invention to provide a brake light which is of durable and reliable construction.

It is yet another object of the present invention to provide a brake light which is economically affordable and available to the buying public.

It is yet another object of the present invention to provide a brake light which provides additional benefits not present in the prior art.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
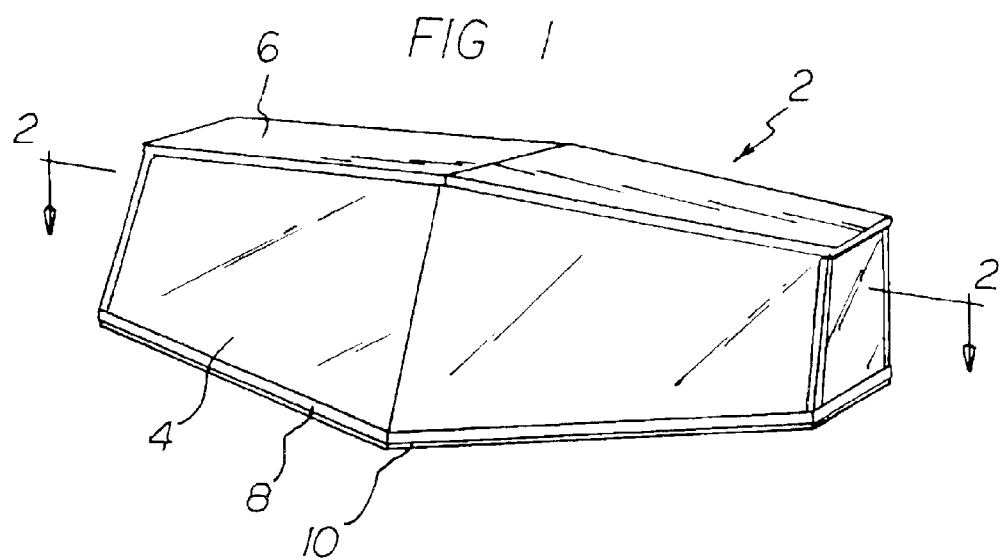
FIG. 1 shows a perspective view of the present invention.

FIG. 1 shows a perspective view of the present invention. The present invention concerns that of a new and improved brake light 2. The brake light 2 would be a forward-facing brake light 2 which would attach to the center front top deck, or hood, of automobiles. The brake light 2 would be hooked up to the brake system of a vehicle in which the present invention would be attached to.

Figure 2:
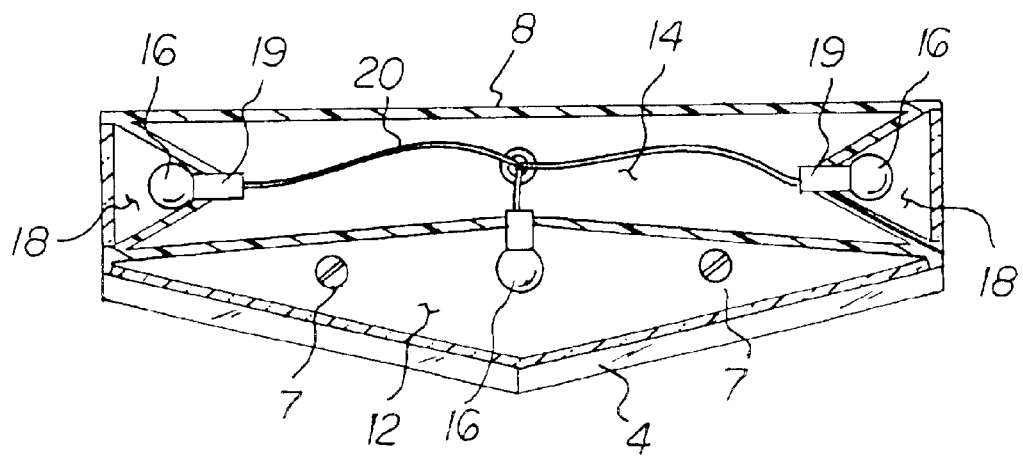
FIG. 2 shows a top view of the present invention

FIG. 2 shows a top cutaway view of the present invention. Looking at FIGS. 1 and 2, brake light 2 has an amber lens 4 as a front cover, and has top piece 6 and base 8. Base 8 has a water-tight gasket 10 which seals the inside of brake light 2 from any outside moisture. Top piece 6 would be kept in place by a pair of exterior housing screws 7.

Lens 4 would serve both as a front cover and as a side cover on brake light 2. The portion of brake light 2 that would be the front would be shaped into two separate segments which together would create a "gull-winged" aerodynamic shape. Each of the two separate segments would bend around and form small side portions on either side of the brake light 2. Although described herein as four separate segments, the four differently-facing areas of the lens 4 preferably would comprise one prefabricated lens.

Internally, brake light 2 has two separate compartments, a front compartment 12 and a rear compartment 14. The front compartment 12 would have a single bulb 16, while the rear compartment would have two bulbs 16. Each of the two bulbs 16 located in the rear compartment would be located within interior bulb reflector compartments 18 which would serve to amplify their light when they would be activated.

Both bulb 16 located within the front compartment 12 and both bulbs 16 located in the rear compartment 14 would utilize a socket 19, which would be electronically connected with wires 20 to the existing braking system of a vehicle. This would allow the present invention to turn on when a user activates the brakes in his or her vehicle and would allow opposing drivers an opportunity to determine what the other would be doing.

Figure 3:
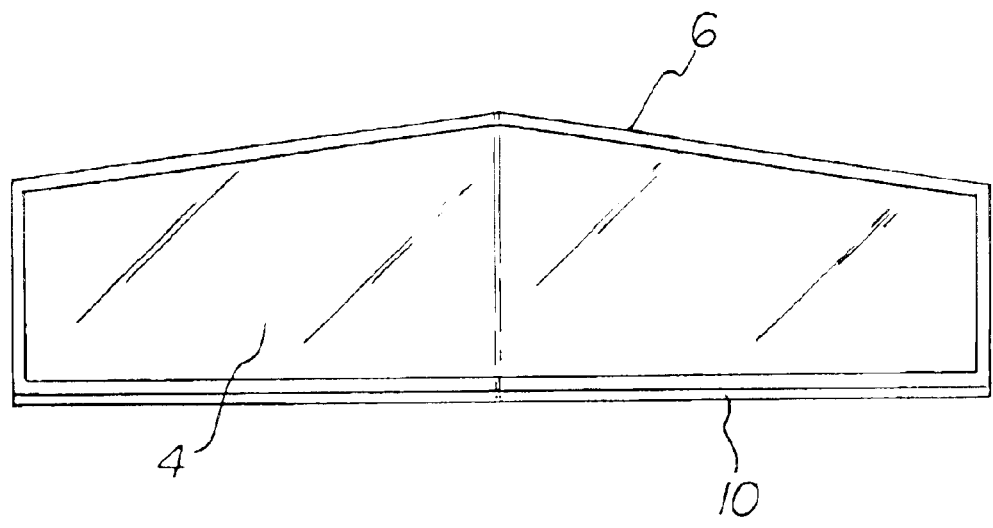
FIG. 3 shows a front view of the present invention.

FIG. 3 shows a front view of the present invention. As can be seen, the top piece 6 curves upward toward the middle and downward on both sides.

In lieu of using bulbs, the present invention could use light emitting diodes (LED's) as the light source. This would be embraced in an alternative embodiment and would be a possible alternative to using bulbs, depending on the situation.

What I claim as my invention is:

1. A forward-facing brake light comprising
   (a) an external housing, the housing comprising a base, the housing further comprising a top piece fixedly attached to the base, the housing further comprising a lens, the lens comprising four separate segments, two larger segments and two smaller segments, the two larger segments being front-mounted in a 'gull-winged' aerodynamic shape, the two smaller segments being side-mounted,
   (b) a pair of compartments, a front compartment and a rear compartment, both of the compartments being located within the external housing,
   (c) at least three light sources, a first light source, a second light source, and a third light source, the first light source being located in the front compartment, the second light source and the third light source being located in the rear compartment, and
   (d) power means for providing power to the light sources.

2. A forward-facing brake light according to claim 1 in combination with a vehicle, the vehicle including a battery, the forward-facing brake light being attached to a location on the vehicle where it would be visible from a location in front of the vehicle.

3. A forward-facing brake light according to claim 2 in combination with a vehicle, wherein the power means preferably comprises the battery located within the vehicle.

4. A forward-facing brake light according to claim 2 in combination with a vehicle wherein all the light sources within the external housing would turn on when the brake pedal in the vehicle would be depressed, and further wherein all the light sources within the external housing would turn off when the brake pedal in the vehicle would be released.

5. A forward-facing brake light according to claim 1 wherein all of the light sources within the external housing would be light bulbs.

6. A forward-facing brake light according to claim 1 wherein all of the light sources within the external housing would be light-emitting diodes.

7. A forward-facing brake light according to claim 1 wherein the rear compartment within the external housing would further comprise a pair of interior reflector compartments, each interior reflector compartment being located adjacent to a smaller segment of the lens, and further wherein at least one light source would be located within each interior reflector compartment.

* * * * *